I. BRACH.
Water-Filter.

No. 164,257.

Patented June 8, 1875.

Witnesses,
Harry Smith
Hubert Howson

Isidor Brach
by his Attorneys,
Howson and Son

UNITED STATES PATENT OFFICE.

ISIDOR BRACH, OF PHILADELPHIA, PENNSYLVANIA.

IMPROVEMENT IN WATER-FILTERS.

Specification forming part of Letters Patent No. 164,257, dated June 8, 1875; application filed April 24, 1875.

*To all whom it may concern:*

Be it known that I, ISIDOR BRACH, of Philadelphia, Pennsylvania, have invented certain Improvements in Water-Filters, of which the following is a specification:

The objects of my invention are to make an effective filtering material, and to construct a cheap filter for attachment to the nozzle of a hydrant, and so arranged as to be readily taken apart for purposes of cleansing or repairs.

These objects I attain in the manner which I will now proceed to describe, reference being had to the accompanying drawing, in which—

Figure 1:
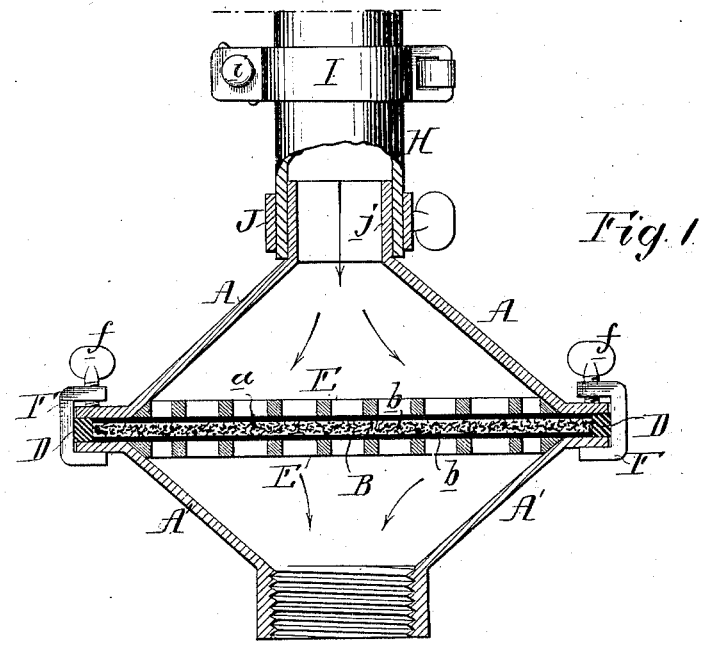
Figure 2:
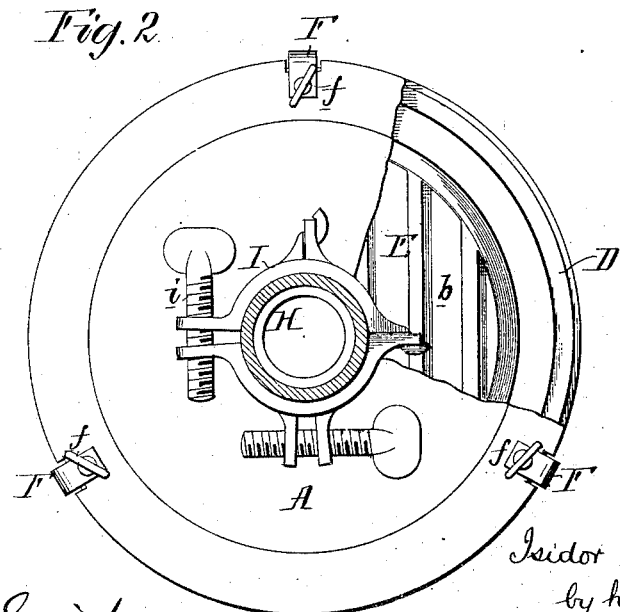

Figure 1 is a vertical section of my improved filter, and Fig. 2 a plan view of the same partly in section.

A A' are the two halves of the casing of the filter, made substantially of the form represented, and provided with flanges, between which is secured the filtering medium B, the edge of the latter being embraced by the rubber ring D for preventing the escape of water. This filtering medium consists of a central disk, $a$, of compressed carbon contained between two circular strips, $b\ b$, of felt, for I have ascertained that by thus compressing the carbon into a solid disk, the effective and rapid clarifying of water can be accomplished with a filtering medium of comparatively limited area and thickness, and that by combining the strips $b\ b$ of felt with this central disk of compressed carbon, the access of solid impurities to and consequent clogging of the disk is prevented, and a serious objection to ordinary filters thus effectually obviated.

The carbon may, in order to add solidity to the disk, be combined in equal proportions with metal, to which, while in a molten state, the carbon is added, the composition being cast into disks of the proper size. I prefer, however, to use the carbon alone on account of its simplicity and economy.

In order to prevent the distension of the filtering medium by the pressure of the water I arrange upon each side of the same a grating, E, fitted snugly to the interior of the two portions A and A' of the casing, and bearing upon the felt-plates $b\ b$.

A further object of this arrangement is to cause the water to take a longer or shorter course in its passage through the filtering-disk, in accordance with the amount of impurities which it contains. Thus, when the bars of the upper and lower gratings E E are parallel, as shown in Fig. 1, the water can pass through the filter in a straight line; but if the water is very impure the gratings may be turned until their bars do not correspond with each other, in which case the water passes through the filtering medium B at an angle, and is in consequence brought into contact with a more extended filtering-surface.

In order to render the filtering medium readily accessible I connect the two halves of the casing together by means of clamps F, which embrace the flanges of the casing, and are provided with set-screws $f$ for forcing the same together.

H is a short tube of rubber or other suitable material, the upper end of which is fitted to the nozzle of a hydrant, and is secured to the same by means of a pair of hinged jaws, I, which can be opened and closed by means of a set-screw, $i$, a similar pair of hinged jaws, J, serving to clamp the lower end of the tube to the branch $j$ of the upper half A of the filter.

It will be understood that although I prefer this mode of connection on account of the ease with which it can be attached to or detached from any object, an ordinary screw-coupling may be used if desired.

I claim as my invention—

1. A filtering medium composed of a disk, $a$, of compressed carbon interposed between two strips, $b\ b$, of felt, as set forth.

2. The combination of the gratings E E, filtering medium B, and rubber ring D, with the flanged edges of the two halves A and A' of the casing, and with the screw-clamps F F.

3. The combination of the flexible tube H, with the hinged jaws I and J for connecting the filter, and a hydrant, as set forth.

In testimony whereof I have signed my name to this specification in the presence of two subscribing witnesses.

ISIDOR BRACH.

Witnesses:
HUBERT HOWSON,
HARRY SMITH.